Figure 1:
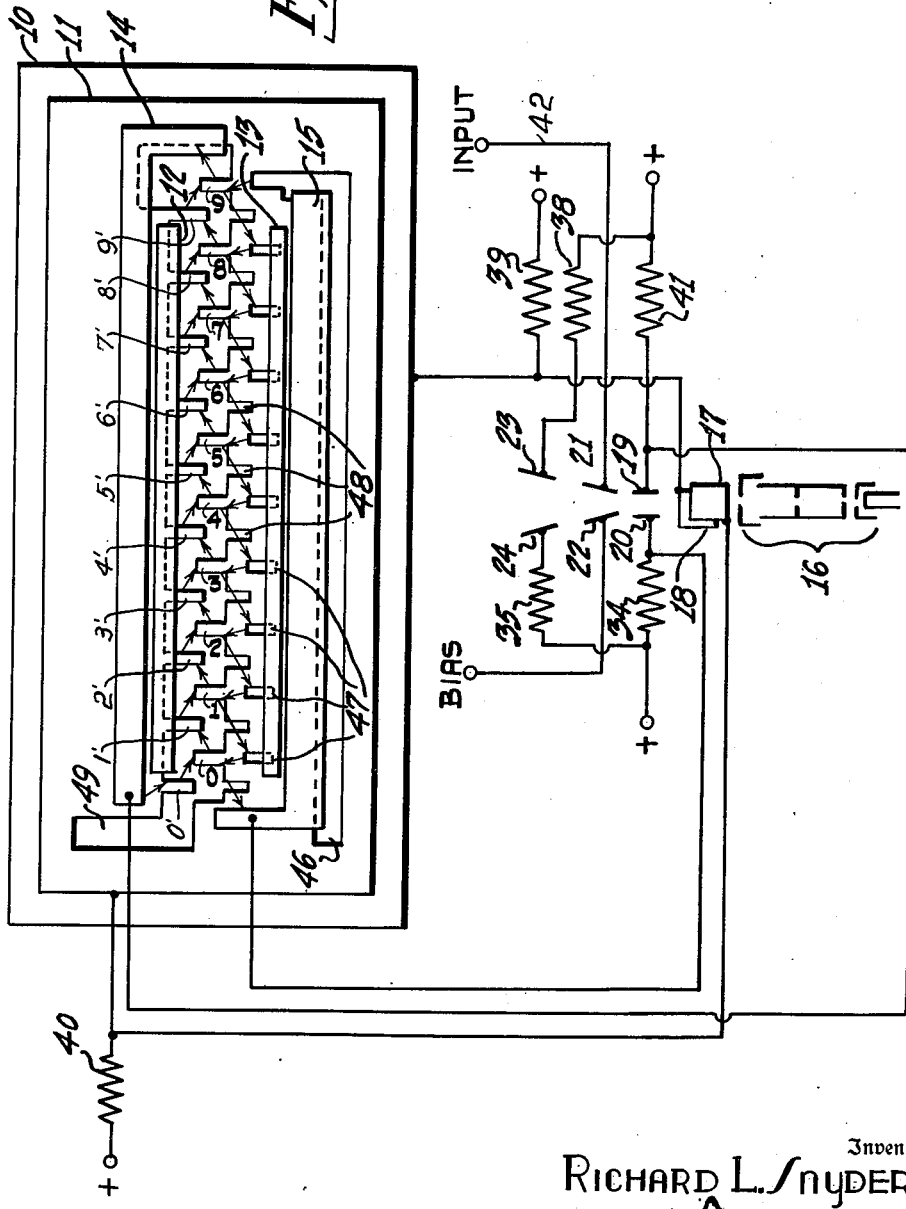

July 16, 1946.                R. L. SNYDER, JR                    2,404,106
                        ELECTRONIC CALCULATING DEVICE
                           Filed Aug. 13, 1943            5 Sheets-Sheet 1

Inventor
RICHARD L. SNYDER, JR.
By
    CD Tuska
                Attorney

July 16, 1946.  R. L. SNYDER, JR  2,404,106
ELECTRONIC CALCULATING DEVICE
Filed Aug. 13, 1943  5 Sheets-Sheet 3

Inventor
RICHARD L. SNYDER, JR.
By
Attorney

July 16, 1946.   R. L. SNYDER, JR   2,404,106
ELECTRONIC CALCULATING DEVICE
Filed Aug. 13, 1943   5 Sheets-Sheet 4
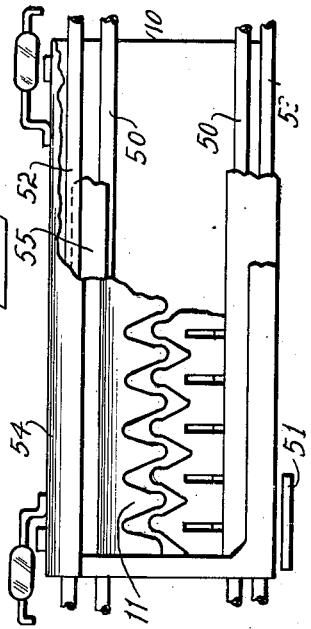
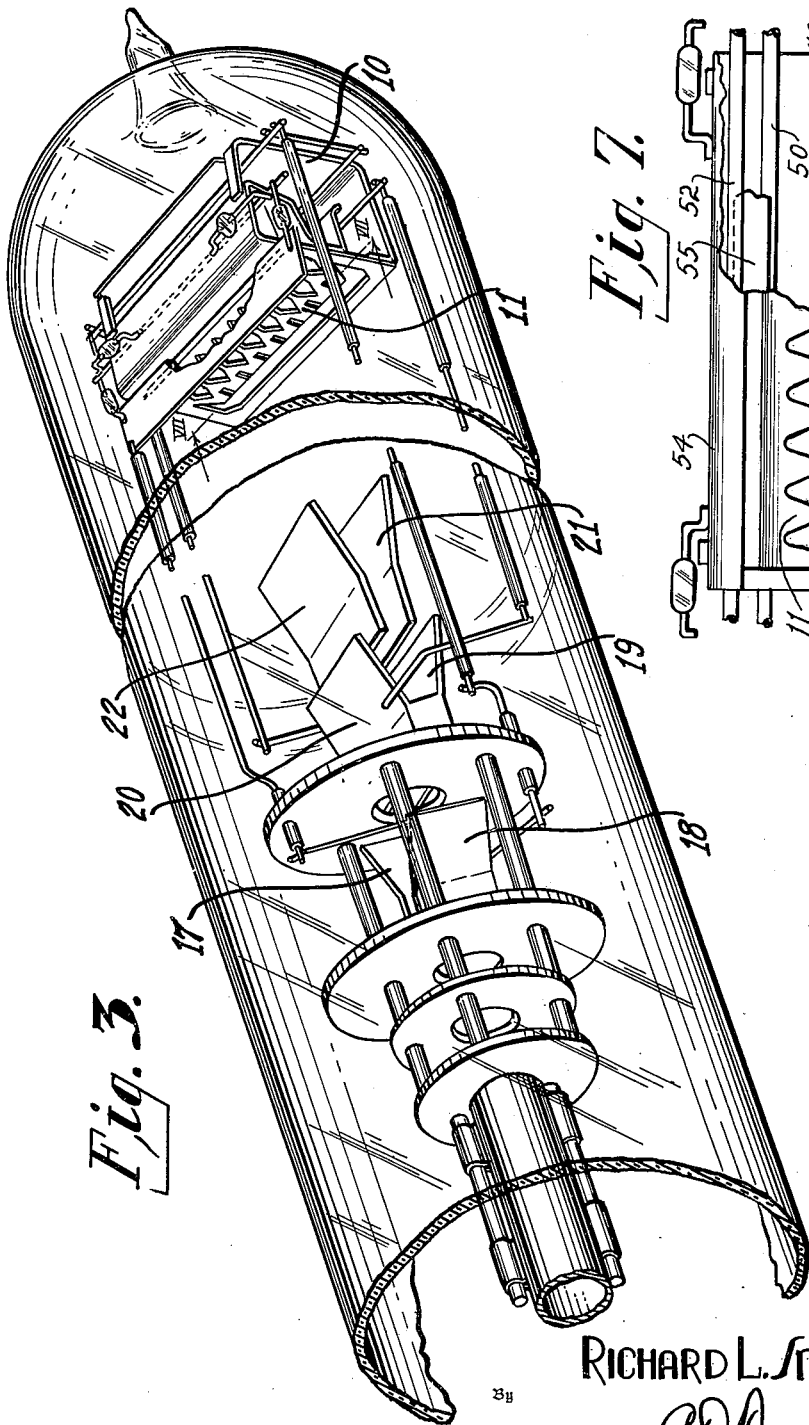
Inventor
RICHARD L. SNYDER, JR.
By
Attorney July 16, 1946.  R. L. SNYDER, JR  2,404,106
ELECTRONIC CALCULATING DEVICE
Filed Aug. 13, 1943  5 Sheets-Sheet 5

Inventor
RICHARD L. SNYDER, JR.
By
C D Tuska
Attorney

Patented July 16, 1946

2,404,106

UNITED STATES PATENT OFFICE 2,404,106

ELECTRONIC CALCULATING DEVICE

Richard L. Snyder, Jr., Princeton, N. J., assignor to Radio Corporation of America, a corporation of Delaware Application August 13, 1943, Serial No. 498,511

14 Claims. (Cl. 235—92)

1

This invention relates to electronic calculating devices such as are adapted to maintain a constant indication of the number of electrical impulses which have been applied to its input terminals. The principal object of the invention is to provide a counting device and method of operation whereby there may be observed at any instant of time either the sum of applied impulses of one polarity or the difference between the number of positive impulses and the number of negative impulses. Otherwise stated, the invention provides a calculating device of the electronic type which functions to count or add impulses so long as they are of the same polarity (either positive or negative) and to uncount or subtract the negative impulses from the positive impulses, or vice versa, when they are of different polarity.

The term "electronic device" is generally understood to designate a device which depends for its operation on the conduction of the electrons which constitute all or the major part of the useful electric current through a vacuum or through a gas. This is characteristic of the electronic calculating device of the present invention which is disclosed in various modifications all of which involve an evacuated receptacle within which are mounted an electron gun for forming a beam of electrons, deflecting electrodes for controlling the position of the beam and a composite target which functions together with the deflecting electrodes to maintain the beam at a position which is at all times indicative of the number of electrical impulses that have been applied to the input terminals of the device.

Various types of electronic calculating devices have been proposed in the past but, insofar as applicant is aware none of these devices,have been operable to subtract the sum of impulses of one polarity from the sum of impulses of a different polarity. This result is achieved by the present device which is susceptible of wide and diverse application both in the art of calculating machines and in connection with a great variety of industrial processes where exact indication or control is required.

The invention will be better understood from the following description considered in connection with the accompanying drawings and its scope is indicated by the appended claims.

Figure 1A:
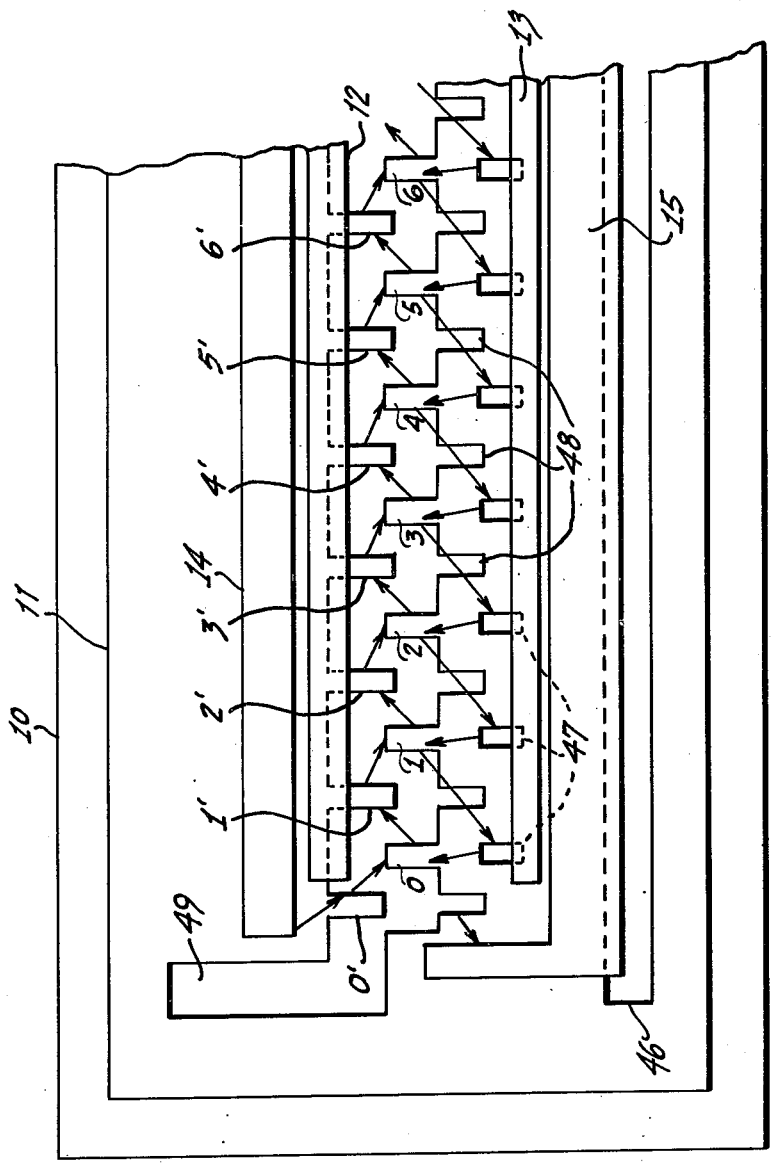

Referring to the various figures of the drawings:

Fig. 1 illustrates one form of target structure utilized in connection with the present invention and also the connections of the various parts of this structure with the deflecting electrodes of the device. While the various elements of this figure are diagrammatically illustrated to some extent, it should be understood at this point, that these various elements, with the exception of the resistors are enclosed within an evacuated container in a manner indicated by Fig. 3, Fig. 1a illustrates the different paths followed by the beam in response to pulses of different polarity. In this figure, as in Fig. 1, the arrows at the left having a course progressing with the numerals 1' to 9' indicate the path of the beam when positive pulses are applied to the input lead and the arrows at the right having a course counter to these numerals indicate the path of the beam when a negative pulse is applied to the input lead.

Figure 6:
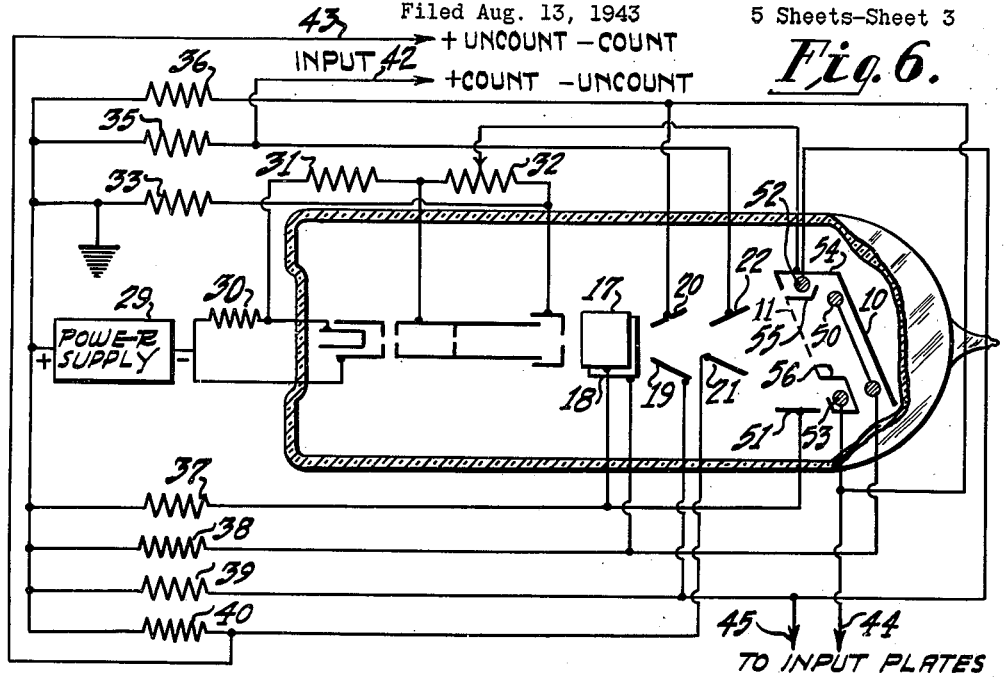
Figure 2:
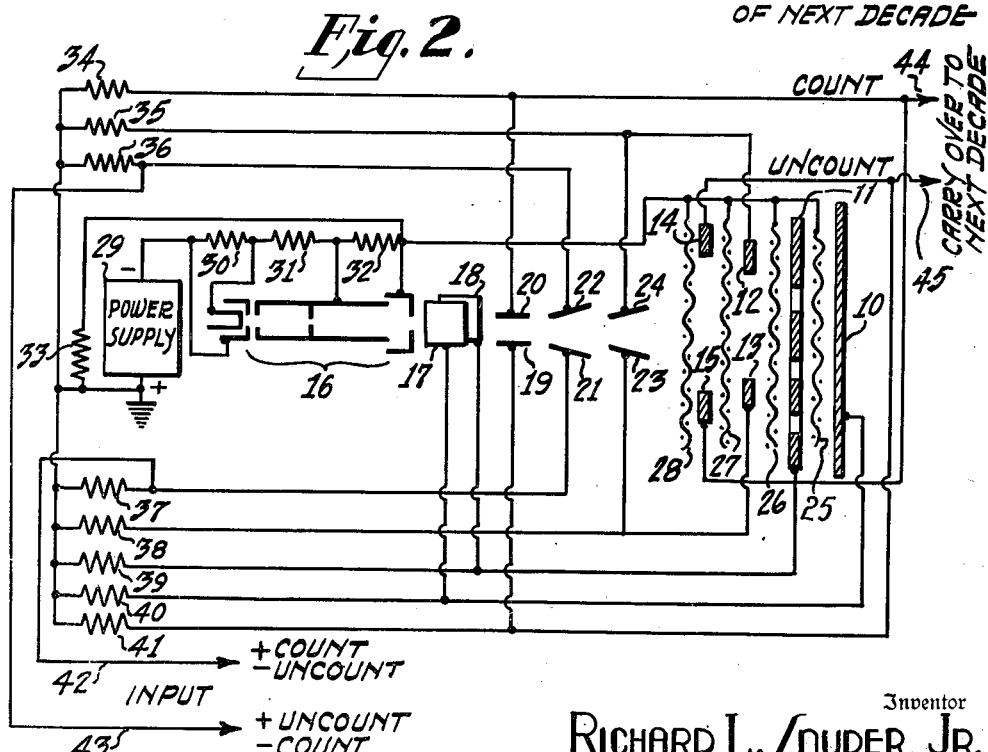
Figure 4:
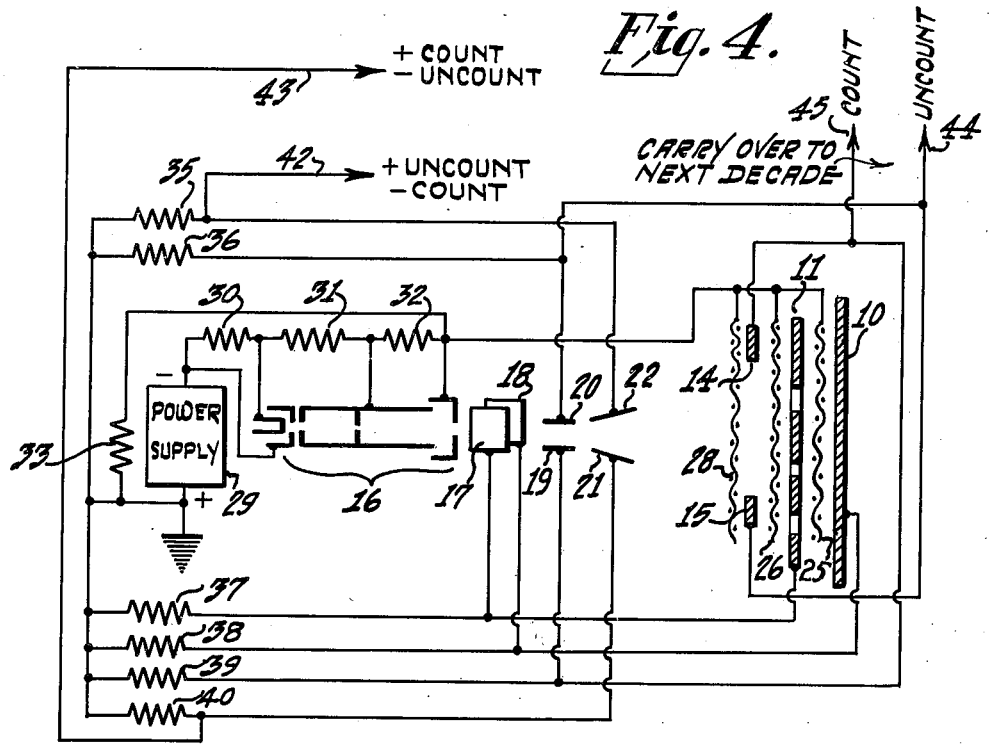
Figure 5:
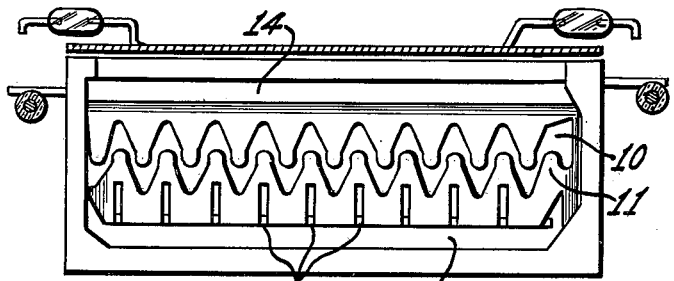

Fig. 2 is a wiring diagram showing the electrical connections of the device of Fig. 1, Figs. 3, 4, and 5 illustrate a modified form of the device, Fig. 3 being a partial perspective view illustrating the entire structure of the device, Fig. 4 being a wiring diagram showing the connection of the device and Fig. 5 being a front view of the composite target of this modified device, and Figs. 6 and 7 illustrate a further modification of the device which depends for its operation on the emission of secondary electrons from certain areas of its target structure.

The form of electronic calculating device illustrated by Figs. 1 and 2 includes a composite target constructed of a solid conductive back plate 10, a plate 11 having perforations 46, 47 and 49 as indicated in Fig. 1, a pair of beam overswing correction strips 12 and 13 and a pair of beam return members 14 and 15 which are L-shaped. All these various parts of the target are electrically insulated from one another and are generally positioned with respect to one another as indicated by Fig. 2.

Associated with this composite target is a well known type of electron gun 16 which functions to produce a beam of electrons directed at the target, a pair of electrodes 17 and 18 for deflecting the electron beam in a direction lengthwise of the target and three pairs of electrodes 19—20, 21—22 and 23—24 for controlling the position of the beam transversely of the target.

In front of each element of the target is provided a grid or shield for the purpose of suppressing secondary electron emission from these elements. These screens or shields are not shown in Fig. 1 but are indicated in Fig. 2 by the reference numerals 25, 26, 27, and 28.

Power for operation of the device is derived from a suitable source 29 (Fig. 2), a suitable distribution of the voltage from this source to the various elements of the device being effected by means of resistors 30 to 41. The sizes of these various resistors are dependent upon the characteristics of the electron gun. The resistors 30, 31 and 32 through which voltage is applied to the cathode, first anode and second anode of the electron gun should be of such size that the voltages of these elements are in the neighborhood of 10,300 and 900 volts respectively. Possible values are 2,000 ohms, 50,000 ohms, 150,000 ohms for the resistors 30, 31 and 32, and 20,000 ohms for the resistor 33 which is connected between the second anode and the positive bus of the power supply source 29. The values of the resistors 34 to 41 connecting the positive bus to the deflecting plates and to the various parts of the target are of course dependent on the current in the beam and the deflection sensitivity. The beam current would normally be in the neighborhood of 50 microamperes and the deflection sensitivity will usually be such that the resistors 34 to 41 may have a value of the order of one megohm. It will be noted that the secondary electron suppressor screens 25, 26, 27 and 28 are subjected to the same voltage as the second anode, namely about 900 volts.

Potential for biasing the electron beam to a predetermined position transversely of the target is applied through a lead 42. The pulse to be counted is applied to the lead 43. The count of the device is transmitted to another similar but higher decimal device through leads 44 and 45.

It should be understood that the bias and input leads 42 and 43 may be interchanged in which case the polarity of the applied pulses is reversed or both leads may be used together where separate inputs of the same polarity are used to count and uncount. Such reversal of the polarity of the pulse is utilized in the carry over connection between decades or between different counting units where the count of the unit is different from that specifically described.

With the target constructed as shown, the device is adapted to accumulate a count of ten and to transfer this count to a similar device which delivers counts in hundreds instead of tens. This process may be carried on to any desired limit, the counts of the successive devices being thousands, tens of thousands, hundreds of thousands, millions, etc. Thus with six of these electronic calculating devices connected one to the other any number up to a million may be indicated merely by noting the positions of the six electron beams. When the count of each device is transferred to the next successive device, it is automatically cleared for another count of ten.

From what has been said, it is obvious that this count of ten may be the sum of ten positive impulses, the sum of ten negative impulses or the sum of an indefinite number of positive and negative impulses. How these results are achieved will become apparent upon further consideration of the details of the target and the effect of the various voltages applied to the device.

Referring to Fig. 1, it will be noted that the perforated plate 11 is provided (1) with an elongated perforation 46, the upper edge of which underlies the L-shaped beam return and transfer bar 15, (2) with a series of smaller perforations 47 which partially underlie the beam overswing correcting strip 13 and (3) with a serrated perforation 49 which underlies the beam overswing correcting strip 12 at its edge, has pairs of teeth 0—0', 1—1', 2—2', 3—3', 4—4', 5—5', 6—6', 7—7', 8—8' and 9—9' extending from its opposite edges and is provided with an elongated slot adjacent the end of the beam return bar 14 as indicated. For convenience in expression, the teeth 0 and 1 to 9 are referred to as counting teeth and the teeth 0' and 1' to 9' are referred to as transfer teeth or beam holding means. The edges of the apertures 47 perform a function similar to that of the edges of the teeth 0' to 9' and are also to be regarded as beam holding means by which the beam is temporarily stabilized in its transfer from one counting tooth to another.

Consideration of the operation of the device of Figs. 1 and 2 should be based on an understanding that any part of the target is made more negative when it is struck by the electron beam. Thus when the beam strikes the perforated plate 11, both this plate and the deflecting electrode 17 to which it is connected become more negative with respect to the deflecting electrode 18 and the beam is deflected toward one end of the target. When the beam strikes the solid plate 10, both this plate and the deflecting electrode 18 to which it is connected become more negative with respect to the deflecting electrode 17 and the beam is deflected in the opposite direction. From this it follows that the beam will find a state of equilibrium or come to rest when it is at the edge of one of the teeth of the perforated plate 11 and is divided between the plates 10 and 11.

A bias potential is applied through the lead 43 to the deflecting electrode 22 for moving the beam transversely of the target so that it tends to register with the counting teeth of the perforated plate 11. Under these conditions, the beam will be at rest at the edge of the tooth 0, for example. If a positive impulse is applied through the lead 42 to the deflecting electrode 21, the beam is moved off this counting tooth 0 into alignment with the opposite row of teeth, strikes the plate 10 and is moved lengthwise of the target till it comes to rest at the edge of the transfer tooth 1'. When the applied impulse subsides, the bias potential applied to the deflecting electrode 22 forces the beam off the transfer tooth 1' where it strikes the solid plate 10 and is deflected to the right to the counting tooth 1. In this manner, the beam is moved from the tooth 0 to the tooth 1, from the tooth 1 to the tooth 2, etc., by a series of impulses which number ten when the beam returns to its original starting position.

This action is similar to that of a mechanical escapement and is sometimes hereinafter so designated.

If the applied impulse is negative instead of positive as assumed above and the beam is at rest at the edge of the tooth 0, the beam is driven onto the transfer bar 15 and lengthwise of the target until it comes to rest at the edge of the tooth 9 where it is stabilized. The path of the beam in response to succession of positive pulses is from tooth to tooth in the following order: 0—1'—1—2'—2—3'—3—4'—4—5'—5—6'—6—7'—7—8'—8—9'—9—transfer bar 14—0'—0. The path of the beam in response to a succession of negative pulses is 0—transfer bar 15—9—47—8—47—7—47—6—47—5—47—4—47—3—47—2—47—1—47—0.

In this manner, the beam is moved step by step in one direction lengthwise of the target if the applied impulses are of positive polarity, is moved step by step in the opposite direction lengthwise of the target if the applied impulses are of negative polarity and is moved back and forth lengthwise of the target if the applied impulses are of mixed polarity. In any of these cases when a resultant count of ten positive or ten negative impulses is reached this count is added to or subtracted from the count of the next successive unit which is similar to that described above.

This transfer of the count of one device to another is effected through the L-shaped beam return or transfer bars 14 and 15. When the beam leaves the tooth above the numeral 9, it strikes the plate 10 and moves lengthwise of the target to the L-shaped beam return and transfer bar 14 causing this bar and the deflecting electrode 19 which is connected to it to become more negative and driving the beam upwardly until it balances on the boundary between 14 and 11. The portion of the beam that strikes 11 makes this target and its deflecting plate go negative driving the beam to the left until it leaves 14 and falls on the boundary between 11 and 10 in the elongated slot of the perforation 49. It then moves along this boundary (providing the pulse has subsided, otherwise it waits until the pulse subsides) and slips off the last transfer tooth 0' to come to rest at 0. At the same time an impulse is applied to the impulse input lead of the next successive device in the series of calculating device units.

If the applied impulses are of such polarity that the beam moves in the opposite direction and finally reaches the tooth 0, it passes from that point to the L-shaped beam return and transfer bar 15 causing this bar and the deflecting electrode 20 which is connected to it to become more negative and deflecting the beam to the opposite end of the bar 15 from whence it passes to a state of rest at the edge of the tooth 9 when the last applied impulse has subsided.

Leads 44 and 45 are provided to connect the bars 14 and 15 to the deflector electrodes 21 and 22 of the next successive decade or unit for transferring the count of the first device to that device.

If the beam deflecting voltage is greater than necessary, the beam is moved transversely of the target to the overswing correction bar 12 or 13 causing the deflecting electrode 24 or 25 to become more negative thereby preventing the excessive deflection which tends to result from the excessive voltage.

Most of the details of the modified device illustrated by Figs. 3, 4, and 5 will be apparent from what has been said in connection with Figs. 1 and 2 and from the use of the same reference numerals to indicate corresponding elements of the various figures. The two modifications mainly differ in that the beam overswing correction bars of the target are omitted in the second modification and in that the shape of the serrated perforation in the member 11 is somewhat different. Omission of the beam overswing correction bars in counter units subsequent to the first in the series is usually permissible for the reason that a voltage of standard value is applied from one counter to another.

It will be noted from Fig. 5 that the teeth of the opposed edges of the serrated perforation in the plate 11 are more nearly in the form of saw teeth than in the case of the first modification of the device. These changes in the structure of the target, however, do not result in any material change in the operation of the device as set forth in connection with Figs. 1 and 2.

The modification of Figs. 6 and 7 involves changes in the target system which result in a somewhat different method of operation. This different method of operation is based on the fact that a collector located in the vicinity of an electrode having a secondary electron emissive surface tends to assume the potential of that electrode when the emissive surface is bombarded by an electron beam.

The target structure of the modification illustrated by Figs. 6 and 7 is similar to that of the modification illustrated by Figs. 3, 4 and 5 insofar as the solid member 10 and the perforated member 11 are concerned. The two modifications differ in that the secondary electron emissive effect mentioned above is utilized to control the beam return movement and movement of the beam transversely of the target in response to the applied input pulses. The arrangement of the various parts of the target lengthwise of the tube is shown by Fig. 6. As viewed to the right of the line A—A of Fig. 6, the target appears as shown in Fig. 7 with the various parts progressively broken away to expose those located behind them.

Thus in the electrode arrangement of Fig. 6, the deflecting electrode 18 is controlled by the potential of a secondary electron collector 50 located in the vicinity of the plate 10 and the deflecting electrode 17 is controlled by the potential of a secondary electron collector 51 located in the vicinity of the plate 11. Likewise the potential of the deflecting electrode 19 is determined by the potential of a secondary electron collector 52 located at one side of the plate 11 and the potential of the deflecting electrode 20 is determined by the potential of a secondary electron collector 53 located at the opposite side of the plate 11.

These collectors 52 and 53 are located in the L-shaped recesses formed by the shields 55 and 56 and perform the same function as the L-shaped beam return electrodes of the first modification. As in the previous modifications, the impulses to be counted are applied to the leads 42 and 43 and the count of the device is transferred through the leads 44 and 45.

This arrangement of the target members permits the whole target to be maintained at the same voltage and the potential of the deflector plates to be controlled by secondary electrons picked up by small collectors from the target area being bombarded. It has the advantage of eliminating the shield screens of the previous modifications and of reducing the capacity (hence speeding up the operation) of the deflector circuits. This construction necessitates the shielding of the various collectors from one another. The shielding is accomplished by the provision of shields 54, 55 and 56 parallel to the direction of the beam and by locating the collectors at different levels in the target relative to a direction parallel to the beam. The connections to the deflecting plates from the collectors as pointed out above are identical with the connections in the assembly using the shielded screens. The target proper is maintained by a connection to the resistor 52 at the same potential as the screens would be in the latter case. Another advantage of this modification lies in the fact that the collectors receive secondary electrons and therefore may receive more current than the beam carries. It will be noted that the target surfaces are tilted so that the beam strikes at an angle, thereby enhancing the secondary emission. The operation of this modification is otherwise the same as that set forth in connection with Figs. 1 to 5.

I claim as my invention:

1. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having opposed rows of complementary teeth extending lengthwise of said target, and means including an electrode of another of said pairs for moving said beam into alignment with one of said rows of teeth.

2. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having opposed rows of complementary teeth extending lengthwise of said target, and means including an electrode of another of said pairs for moving said beam into alignment with one of said rows of teeth and means including the other electrode of said other pair for moving said beam into alignment with the other of said rows.

3. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having opposed rows of complementary teeth extending lengthwise of said target, and means including the electrodes of another of said pairs for moving said beam step by step between the successive teeth of one of said rows in response to successive impulses applied to one electrode of said other pair.

4. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having opposed rows of complementary teeth extending lengthwise of said target, and means including the electrodes of another of said pairs for moving said beam lengthwise of said target by successive steps each comprising stabilization of said beam at a tooth in one of said rows and transfer of said beam to a complementary tooth in the other of said rows in response to an impulse to be counted.

5. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having a row of counting teeth extending lengthwise of said target and a row of complementary transfer teeth opposed to said row of counting teeth, and means including the electrodes of another of said pairs for moving said beam between said rows of teeth and stabilizing said beam at successive teeth of said counting teeth row.

6. In a calculating device including means for forming a beam of electrons and pairs of electrodes for determining the position of said beam, the combination of a target provided with a solid member connected to one electrode of one of said pairs for moving said beam lengthwise of said target in one direction and with an apertured member mounted in front of said solid member and connected to the other electrode of said pair for deflecting said beam lengthwise of said target in the opposite direction, one aperture of said apertured member having opposed rows of complementary teeth extending lengthwise of said target, and means including the electrodes of another of said pairs for moving said beam step by step between the successive teeth of one of said rows in response to successive impulses applied to one electrode of said other pair, and means including the electrodes of still another of said pairs for returning said beam to its initial stabilized position and transferring the count to a pair of output terminals.

7. In a calculating device including means for forming an electron beam and first, second and third pairs of electrodes for controlling the position of said beam, the combination of a composite target comprising one member connected to one of the electrodes of said first pair, another member connected to the other electrode of said first pair and provided with an aperture having a row of counting teeth and an opposed and complementary row of transfer teeth and a beam return member mounted at the side of said aperture, means including one electrode of said third pair for stabilizing said beam successively at each successive tooth of said counting row and means including the other electrode of said third pair for moving said beam to a complementary transfer tooth in response to an impulse to be counted.

8. In a calculating device including means for forming an electron beam and first, second and third pairs of electrodes for controlling the position of said beam, the combination of a composite target comprising one member connected to one of the electrodes of said first pair, another member connected to the other electrode of said first pair and provided with an aperture having a row of counting teeth and an opposed and complementary row of transfer teeth and a beam return member mounted at the side of said aperture, means including one electrode of said third pair for stabilizing said beam successively at each successive tooth of said counting row and means including the other electrode of said third pair for moving said beam to a complementary transfer tooth in response to an impulse to be counted and means interconnecting said beam return members and the electrodes of said second pair for returning the beam to its starting position when the count has been completed.

9. In a calculating device including means for forming an electron beam and first, second, third and fourth pairs of electrodes for controlling the position of said beam, the combination of a composite target comprising one member connected to one of the electrodes of said first pair, another member connected to the other electrode of said first pair and provided with an aperture having a row of counting teeth and an opposed and complementary row of transfer teeth and a beam return member mounted at the side of said aperture, means including one electrode of said third pair for stabilizing said beam successively at each successive tooth of said counting row and means including the other electrode of said third pair for moving said beam to a complementary transfer tooth in response to an impulse to be counted and means interconnecting said beam return members and the electrodes of said second pair for returning the beam to its starting position when the count has been completed, and means including a pair of members mounted at opposite sides of said aperture and connected to the electrodes of said fourth pair for limiting the movement of said beam transversely of said aperture.

10. In a calculating device including means for forming an electron beam and pairs of electrodes for controlling the position of said beam, the combination of a composite target including one member connected to one electrode of one of said pairs and another member connected to the other electrode of said pair and provided with apertures one of which has a row of counting teeth along one of its edges and the others of which are aligned and complementary to said teeth, means including an electrode of another of said pairs for stabilizing successively at each successive tooth of said counting row, and means including the other electrode of said other pair for moving said beam to the complementary aperture in response to an impulse to be counted.

11. In a calculating device including means for forming a beam of electrons and a plurality of pairs of electrodes for controlling the position of said beam, the combination of a composite target which includes one member connected to one electrode of one of said pairs, another member connected to the other electrode of said pair and perforated to form one aperture with a row of counting teeth extending lengthwise of the target and to form a row of transfer apertures parallel and complementary to said teeth and a beam return and count transfer member mounted adjacent said apertures, means including one electrode of another of said pairs for stabilizing said beam successively at each of said counting teeth, means including the other electrode of said other pair for moving said beam to a complementary transfer aperture in response to an impulse to be counted, and means interconnecting said beam return and transfer bar to an electrode of still another of said pairs for returning said beam to its starting position when the count has been completed.

12. In a calculating device including means for forming a beam of electrons and a plurality of pairs of electrodes for controlling the position of said beam, the combination of a composite target which includes one member provided with a secondary electron emissive surface associated with a collector connected to one electrode of one of said pairs, another member provided with a secondary electron emissive surface associated with a collector connected to the other electrode of said pair and perforated to form a row of counting teeth lengthwise of said target and to form a row of complementary transfer areas, means including an electrode of another of said pairs for stabilizing said beam successively at different ones of said teeth, and means including the other electrode of said other pair for moving said beam to a complementary transfer area in response to an impulse to be counted.

13. In a calculating device including means for forming a beam of electrons and pairs of electrodes for controlling the position of said beam, the combination of a composite target which includes one member connected to one electrode of one of said pairs, another member connected with the other electrode of said pair and perforated to form a row of counting teeth and complementary rows of beam holding means located at opposite sides of said teeth, means including an electrode of another of said pairs for stabilizing said beam successively at different ones of said teeth, and means including the other electrode of said other pair for moving said beam to one of two complementary beam holding means depending on whether an impulse is to be added or subtracted.

14. In a calculating device including means for forming a beam of electrons and pairs of electrodes for controlling the position of said beam, the combination of a composite target which includes one member connected to one electrode of one of said pairs, another member connected with the other electrode of said pair and perforated to form a row of counting teeth and complementary rows of beam holding means located at opposite sides of said teeth, means including an electrode of another of said pairs for stabilizing said beam successively at different ones of said teeth, and means including the other electrode of said other pair for moving said beam to one of two complementary beam holding means depending on whether an impulse is to be added or subtracted, and means including still another of said electrode pairs for returning said beam to its starting position when the count has been completed.

RICHARD L. SNYDER, Jr.